United States Patent [19] [11] 3,983,931
Whitehead et al. [45] Oct. 5, 1976

[54] METHOD AND APPARATUS FOR TRANSFERRING HEAT TO OR FROM MATERIAL

[75] Inventors: Alan Barmforth Whitehead, Beaumaris; Dennis Charles Dent, Croydon, both of Australia

[73] Assignee: Commonwealth Scientific and Industrial Research Organization, Campbell, Australia

[22] Filed: Feb. 15, 1973

[21] Appl. No.: 332,586

[30] Foreign Application Priority Data
Feb. 15, 1972 Australia............................ 7964/72
May 4, 1972 Australia............................ 8845/72

[52] U.S. Cl. ............................. 165/88; 165/104 F; 432/58; 122/4 D
[51] Int. Cl.² ........................................ F28D 13/00
[58] Field of Search ................ 165/92, 88, 86, 104, 165/84; 122/4 D; 34/57 A, 57 R, 57 D, 57 E; 432/58

[56] References Cited
UNITED STATES PATENTS
1,839,057 12/1931 Singrun................................ 165/88
2,231,249 2/1941 Brown................................... 165/88
2,884,229 4/1959 Francis et al. ....................... 165/88
2,899,375 8/1959 Fenske et al.................... 165/104 X
3,031,144 4/1962 Suga .............................. 165/104 X FOREIGN PATENTS OR APPLICATIONS
859,359 1/1961 United Kingdom................... 165/92

Primary Examiner—Albert W. Davis, Jr.
Attorney, Agent, or Firm—Woodhams, Blanchard and Flynn

[57] ABSTRACT

Method and apparatus for transferring heat to or from a substance, transfer being effected from or to a fluidized bed which floatingly supports a vessel containing the substance.

18 Claims, 16 Drawing Figures

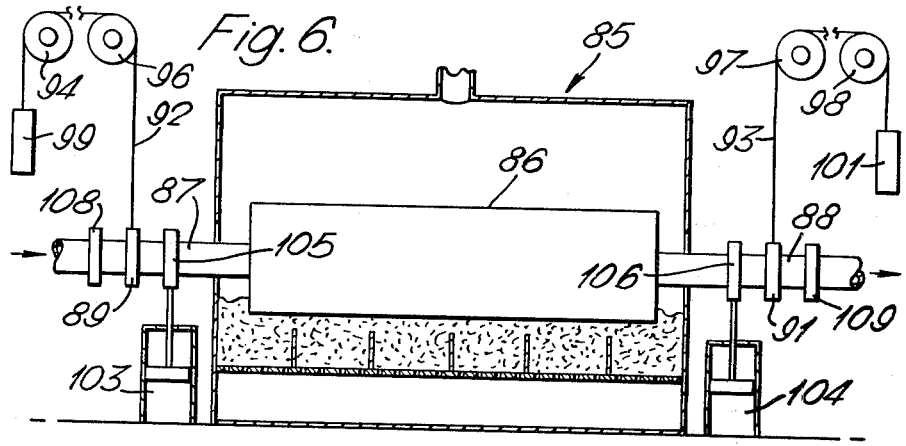
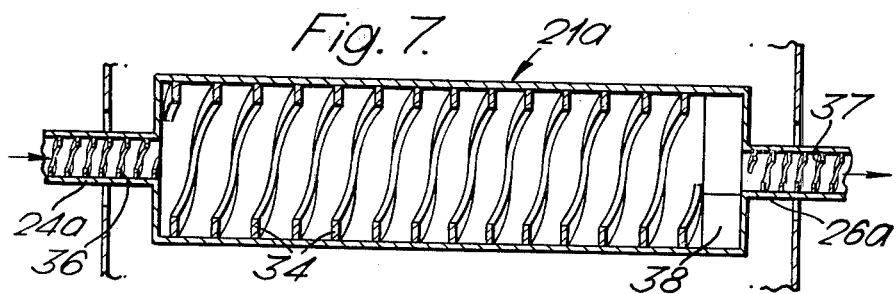
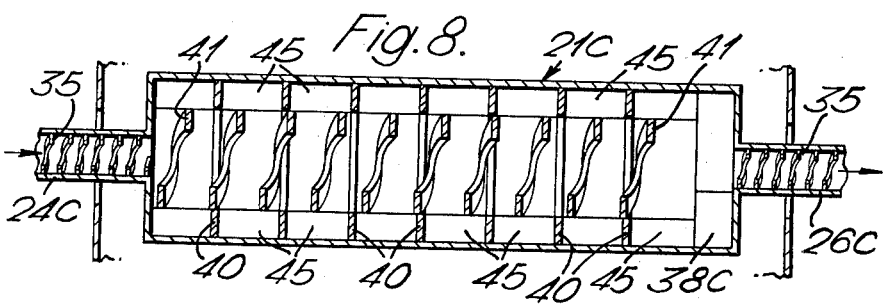
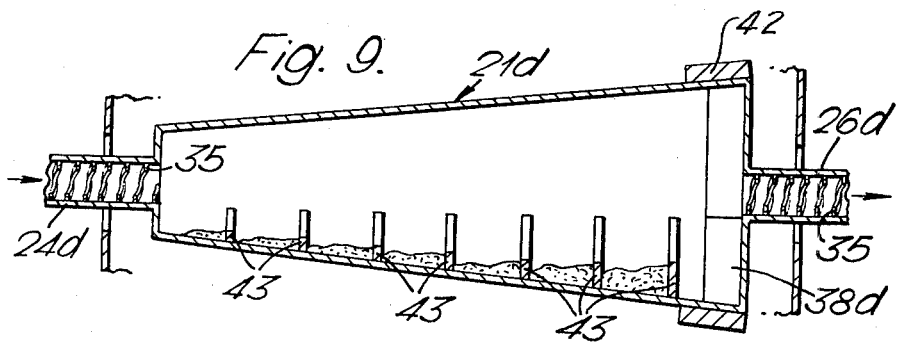

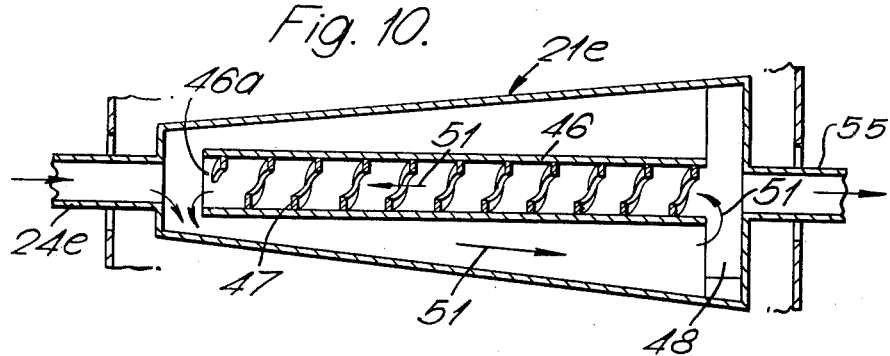
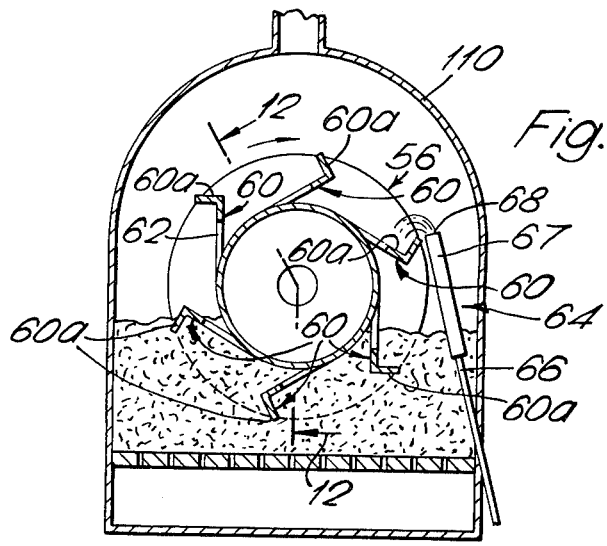
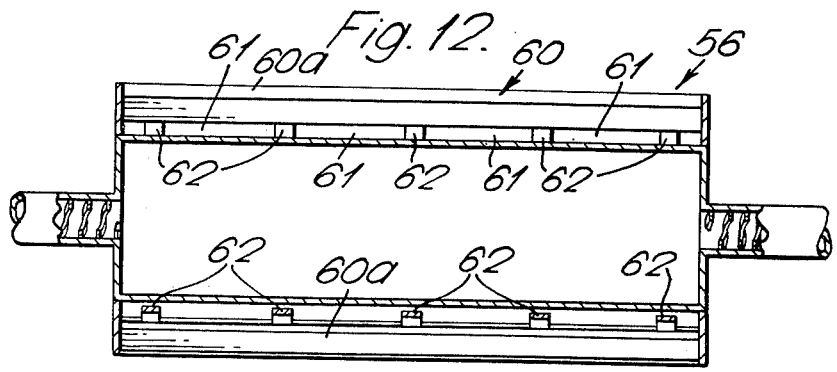

METHOD AND APPARATUS FOR TRANSFERRING HEAT TO OR FROM MATERIAL

BACKGROUND OF THE INVENTION i. Field of the Invention

This invention is concerned with equipment and techniques for transferring heat to or from material within a vessel or container and in particular, seeks to provide means whereby mechanical stresses in such vessels can be greatly reduced to allow for extremes of physical dimensions, temperature, and other operational stresses such as corrosive atmosphere.

ii. Description of the Prior Art

While the use of fluidised beds to transfer heat to the surfaces of a kinetic heat exchanger located within the bed is well known in the art, all such arrangements employ fluid in the heat exchanger and are therefore not suitable for the indirect drying or freezing of particulate solids by passage of the particulate solids through the heat exchanger.

On the other hand, while indirectly heated fixed retorts with either static or moving charges are also well known, as for example coal gasification retorts or zinc volatilisation retorts, the need to use complex mechanical means to effect solids movement therein and therefrom restricts their use.

A further disadvantage is the inefficient rate of heat transfer to and from the static or relatively immobile contents of such retorts. Directly or indirectly heated rabbled furnaces are also known, but the need to stir or rake the contents presents considerable technical problems especially where high temperatures and corrosive atmospheres are involved. Similarly, although rotating kilns and freezing tunnels provide a well-known means of agitating the substance to effect efficient heat transfer, the problems associated with gaseous direct heating or cooling are inherent. Moreover, the mechanical difficulties of operating large kilns of this nature at high temperatures in a corrosive atmosphere are frequently critical.

An object of the invention is to provide techniques which combine many of the advantages of the above prior art systems while at least partly avoiding the disadvantages thereof.

BRIEF SUMMARY OF THE INVENTION

According to one aspect of the present invention, the vessel or container is at least partially floated on or within a fluidised bed of solid particulate material of appropriate bulk density which supports a portion, if not all, of the weight of the vessel and can serve at the same time as a heat transfer medium by which heat is transferred to or from the vessel or container. By arranging the bed geometry appropriately, it has been found, surprisingly, that large and heavy metal or ceramic reaction vessels with full reactant charges can be floated completely. It might, in this respect, commonly be supposed that the presence of a relatively large object immersed in a fluidised bed would so distort the flow of gas through the bed that fluidisation would not be maintained or that the object would be subject to uncontrolled movements. On the contrary, it has been found that floating can be achieved without the need to immerse more than a minor portion of the volume of the vessel below the level of the bed if this is desired, so that a long cylindrical vessel can be floated on the fluidised bed with its axis horizontal and with inlet and outlet feed leads located coaxially and above the bed to allow for rotation of the vessel about its axis, such rotation being used to convey material continuously through the vessel.

More particularly, the invention provides a method of transferring heat to or from a substance to be treated wherein said substance is placed in a vessel which is at least partially floated on or within a fluidised bed of solid particulate material and the transfer of heat is effected by effecting heat transfer between said fluidised bed and said vessel.

This invention also provides apparatus for transferring heat to or from a substance to be treated including, an inner movable vessel which is at least partially floatable and an outer housing extending below and at least partially encompassing said vessel, feed means for feeding the substance into said vessel and for withdrawing the substance from the vessel and fluid bed means which, in use of the apparatus, operates to form a fluidised bed of particulate material in said housing to at least partially floatingly support said vessel thereon or therein, and through which heat transfer to or from said vessel can be effected.

Preferably the apparatus also incorporates mounting means for the purpose of roughly locating the vessel within the housing whereby various movements imparted to the vessel, such as rotatory or oscillating movements, will not dislodge the vessel from the housing. Such mounting means may consist of yokes or collars located within or outside the housing, to coact with trunnions or the like on the vessel. However, such arrangements are not essential to the purpose of the present invention. In fact, it is envisaged that vessels of an appropriate shape will be located solely or primarily by flow patterns established within the fluidised bed by complementary design of the distributor means. Even here, however, some form of mounting means is normally preferred to locate the vessel prior to fluidisation of the bed. This mounting may also provide partial support means for the vessel.

BRIEF DESCRIPTION OF THE SEVERAL VIEWS OF THE ACCOMPANYING DRAWING

The invention is now described in detail with reference to the accompanying drawings, in which:

FIGS. 3, 4 and 5 are diagrammatic transverse cross-sections illustrating different variant configurations for a floating body incorporated in the apparatus of FIG. 1;

Figure 1:
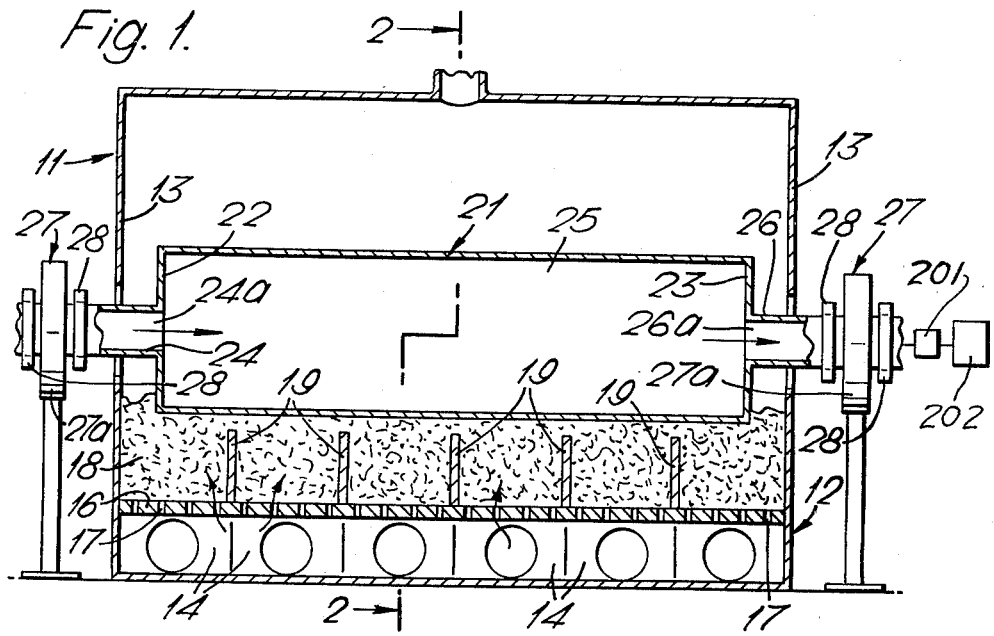
FIG. 1 is a partly diagrammatic vertical axial section of one form of apparatus constructed in accordance with the invention.
Figure 13:
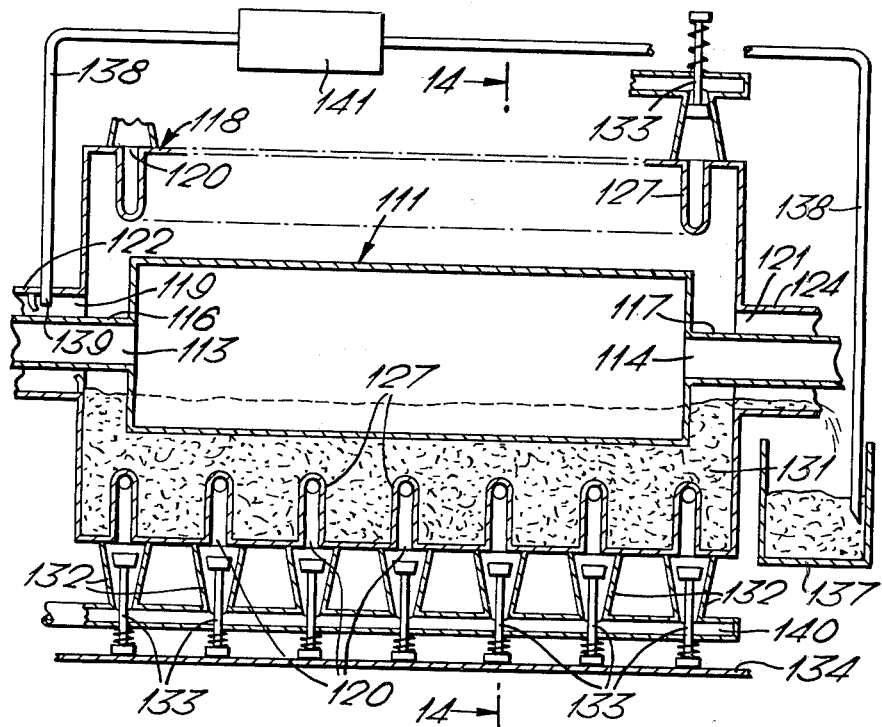
Figure 14:
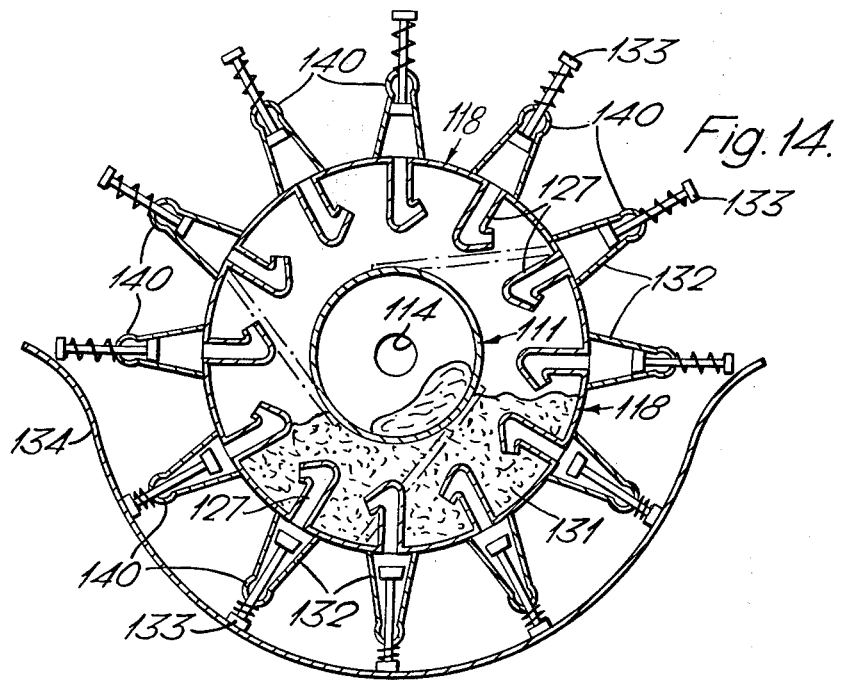
Figure 15:
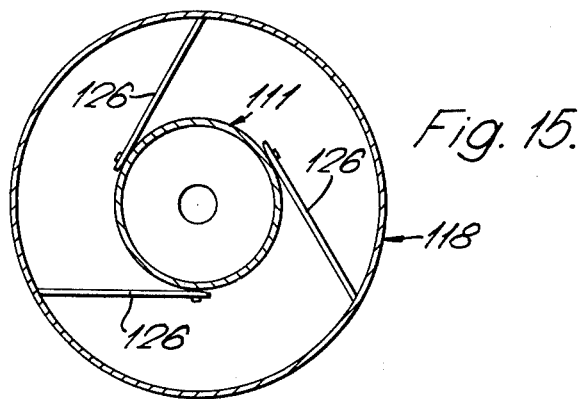
Figure 16:
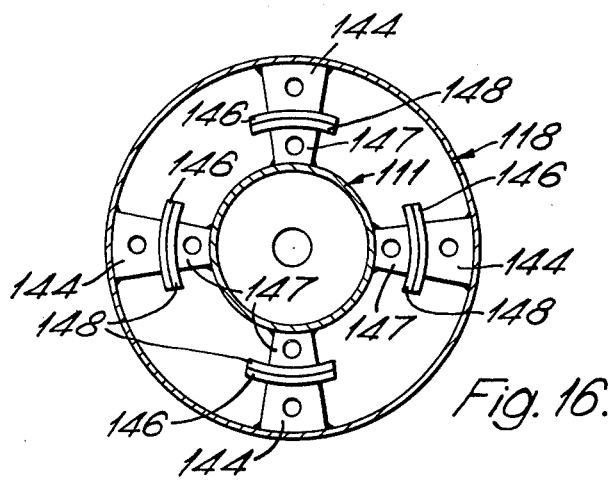

FIGS. 6 to 10 inclusive are respectively partly diagrammatic longitudinal cross-sections showing modifications of the apparatus of FIG. 1 to secure continuous flow-through of material to be treated;

FIG. 11 is a partly diagrammatic transverse cross-section of an apparatus, like that of FIG. 3, but showing another modification;

FIG. 12 is a longitudinal section on the line 12—12 in FIG. 11;

FIG. 13 is a partly diagrammatic longitudinal cross-section of a further apparatus constructed in accordance with the invention;

FIG. 14 is a cross-section on the line 14—14 in FIG. 13;

FIGS. 15 and 16 are diagrammatic transverse cross-sections of the apparatus of FIGS. 13 and 14, showing

DETAILED DESCRIPTION

Figure 2:
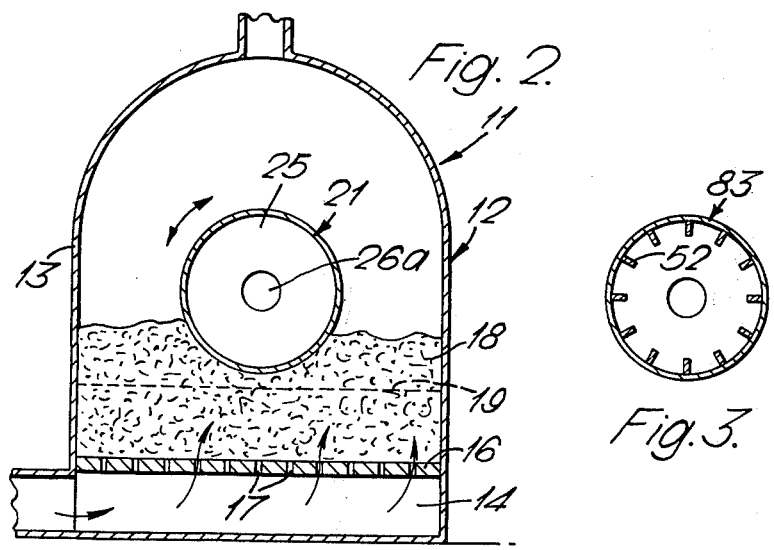
FIG. 2 is a cross-section on the line 2—2 in FIG. 1.

The apparatus 11 of FIGS. 1 and 2 includes a fluidised bed structure 12, this being in the form of a closed housing having an upright side wall 13 and a plurality of fluid delivery chambers 14 along the lower part thereof. These are defined, at upper sides thereof, by a horizontal distributor plate 16 which extends across the housing. It is provided with a plurality of apertures 17 preferably of the non-sifting type. A bed of particulate solids 18 laid over plate 16 is retained in a plurality of compartments in the housing by vertical walls 19, and when a fluid, such as hot or cold gas, is supplied to the chambers 14 it can pass upwardly through openings 17 to fluidise the bed 18. Such a fluidised bed of solids is formed when the fluid is forced upwards through the mass of particulate solids at a rate greater than that known as the incipient fluiding flow. The phenomenon is known per se and is described, for example, in Kirk-Othmer's Encyclopedia of Chemical Technology, pages 398–445, 2nd Edition, Vol. 9.

A vessel for receiving material to be treated is provided and this is in the form of a hollow buoyant cylindrical contactor 21. Contactor 21 rests upon and is floatingly supported by bed 18, when the bed is fluidised, this occurring because of the buoyancy of the contactor. When the bed is defluidised the bed contracts, as is well known, and the vessel remains only partially immersed on the bed surface but remains, nevertheless, uniformly supported over its length. Refluidisation restores buoyancy to the system to refloat the contactor. Walls 19 support the contactor when the bed is removed completely and can also support the contactor during construction thereof. The walls can also reduce lateral cross-mixing of the support bed and allow temperature gradients to be maintained along the contactor if this is so desired. Such temperature gradients can be achieved by supplying fluidising gas streams of different temperatures to the compartments between walls 19.

Contactor 21 has transverse end walls 22, 23 and axially outwardly extending tubular extensions 24, 26 are secured to these walls, which extensions 24 and 26 pass through enlarged openings formed in the side walls 13. These extensions open into the interior 25 of the contactor 21 and provide an inlet 24a and an outlet 26a for the contactor. Bearings 27 are provided, one at each end of the contactor, these receiving the extensions 24, 26. The bearings are such as to allow vertical movement of the contactor 21 but give lateral restraint to it. In this construction they are in the form of upstanding yokes, each with a pair of vertical laterally spaced restraining arms 27a. Collars 28 are fitted to extensions 24, 26 one to either side of the associated bearings 27 and these prevent substantial axial movement of contactor 21 but allow for thermal expansion and contraction whilst also allowing free rotational movement of the contactor. Additional restraint on both lateral and axial movements of the contactor may be imposed by a suitable proportioning of apertures 17, or by the introduction of additional fluidising gas by means of lances or pipe networks located above plate 16, to provide areas of greater upward pressure on the contactor and between which the contactor is centred. Means is provided for rotating the contactor about its axis, which rotation may be a continuous unidirectional movement or a series of alternately directed movements (i.e. oscillation). This means may be in the form of a mechanical drive means 201 which drives the contactor 21 through a flexible joint 202 to accommodate the necessary vertical movement. The bed 18 will, as previously mentioned in this respect, expand on fluidisation and contract on defluidisation and the resultant vertical movement of the contactor is accommodated by the flexible joint.

In use, material to be treated is passed through one extension 24, 26 through the interior 25 of the contactor and out of the other extension 26, 24. The temperature of the material being treated may be controlled by either heating or cooling bed 18. The material can be passed continuously through the contactor or batches may be treated separately.

The arrangement has the following particular advantages:

1. A high heat transfer coefficient from the bed to the contactor is possible.
2. Heat release within the fluidised bed is relatively easy to achieve by direct combustion of oil, coal or gas. Alternatively, heat can be removed from the bed by evaporation of a fluid or by the immersion of the heat transfer surface within bed 18.
3. The bed can be solidified and refluidised at will without mechanical stress being induced in contactor 21.
4. The contactor 21 is relatively easy to construct; because it is supported along its whole length it does not need to be capable of great rigidity when held at the ends and can thus be fabricated from materials not possessing great structural strength. This is of some advantage since, if the contactor is to be heated to high temperatures, or is to resist corrosion by particular materials to be treated, the allowable structural materials may be materials of not very great structural strength. Normally, the contactor will be fabricated as a monolithic structure but it may be constructed, for example, of a plurality of end-to-end annular elements held together by continuous application of axial compressive forces to the ends of the contactor.

The behaviour of the contactor during operation is dependent on the relationship between the bulk density of the material being processed and the effective bulk density of the fluidised bed 18. If the bulk density of the material within the contactor is equal to or greater than the effective bulk density of bed 18, the internal construction of the contactor 21 may be important if external means is not to be used to maintain the rotational axis of the contactor stabilised. In this respect a freely floating plain cylinder which is partly filled with particulate solids material and rotated will invariably, if rotation is continued for a sufficient time, cause the material to congregate at one end, thus causing the cylinder to tip at that end.

FIG. 7 shows one arrangement for allowing continuous operation whilst ensuring reasonably constant distribution of material along the length of the rotating contactor 21a to thereby avoid the last-mentioned difficulty. The contactor 21a has, fitted to the internal cylindrical surface thereof, a continuous or discontinuous helical baffle 34 which extends from end to end thereof. The contactor extensions 24a, 26a are likewise fitted with internal helical baffles 36, 37. Material to be treated is passed in through extensions 24a and is fed through the contactor towards extension 26a. The material rests upon the bottom of the contactor and is picked up therefrom at the discharge end by a delivery scoop 38 which passes the material to extension 26a and thence to discharge. This arrangement provides a relatively short residence time for material in the contactor.

FIG. 8 shows a further modification for use where solids residence time is required. The interior of a rotary contactor 21c is, in this case, fitted with a series of annular baffles 40 which are secured to the internal cylindrical surface on the contactor at spaced dispositions along the length thereof. These retain separate quantities of solids passed into the contactor. Spaced radially inwardly of these annuli is a continuous or discontinuous helical screw 41 which conveys solids from the inlet end to the outlet end with substantially complete mixing of the quantities of material held in the compartments defined by the spaces 45 between adjacent pairs of baffles 40. Inlet and discharge may be achieved by the use of helical baffles 35 in extensions 24c, 26c and by a scoop 38c in the same manner as in the arrangement of FIG. 2.

FIG. 9 shows yet another modified arrangement also designed to prevent tilting of the contactor. In this case, the contactor 21d is of frusto-conical configuration, ballasted, at the larger diameter end, by ballast weight 42 so that it floats with its longitudinal axis horizontal. It is provided with a plurality of annular baffles 43 on the interior surface thereof and spaced along the length of the contactor. In use, material to be processed are located between adjacent pairs of baffles 43. Transfer from free end to discharge end is achieved under the influence of gravity, the material moving down the inclined lower internal surface of the contactor.

Inlet and outlet again may be achieved by the use of helical baffles 35 on the contactor extensions 24d, 26d and by the use of a material scoop 38d adjacent the outlet extension as in the contactors of FIGS. 7 and 8. The arrangement of FIG. 9 might be used for processing by oscillating the contactor rather than rotating it completely. In this case, the baffles 43 need not be extended completely around the internal periphery of the contactor but only over the lowermost portions thereof as shown.

FIG. 10 shows a variation of the contactor of FIG. 9 intended for recirculation of material within the contactor.

In this instance the contactor 21e is frusto-conical and has an internal cylindrical portion 46, which is coaxial with the axis of the contactor, and an internal helical baffle 47 on the inner surface. In use, material is processed in a batch which is introduced into the contactor via extension 24e. Introduced material, passes along the floor of the contactor and is scooped when it reaches the end of the contactor by a scoop or end baffle 48, thence to pass in the retrograde direction along tubular part 46 to be discharged from end opening 46a thereof adjacent the inlet end of the contactor. Thus, in use, material is continuously circulated along the path 51 shown in the drawing. At the end of a desired treatment period, the material is removed from an end outlet extension 55.

Figure 4:
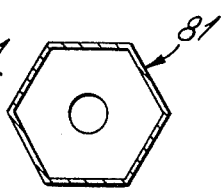
Figure 5:
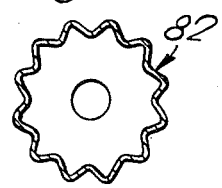

The contactor may, instead of being of circular cross-section, be of other configuration such as the polygonal configuration of the contactor 81 as shown in FIG. 4 or of fluted configuration as is the contactor 82 as shown in FIG. 5. These altered configurations modify the internal solids movement and provide increased heat transfer surface.

FIG. 3 shows a modified contactor 83 wherein longitudinal internal solids lifting bars 52 are provided to faciliate heat transfer to material in the contactor.

If the bulk density of the material within the contactor is less than the effective bulk density of bed 18 there is no tendency for the contactor cylinder to tip providing the weight of solids being processed is less than the buoyancy force induced by tilting the contactor. However, it may still be necessary to incorporate internal baffles and/or modify the shape of the vessel to control solids residence time and also to allow for changes in the bulk density of solids being processed.

The apparatus 85 of FIG. 6 utilises a contactor 86 of simple cylindrical configuration, but includes means enabling the contactor to be positionally stabilised during rotation thereof and to be selectively moved in a manner causing movement of material therethrough. Thus, end feed extensions 87, 88 have collars 89, 91 fitted thereto and cables 92, 93 are connected respectively to these. The cables extend upwardly and over respective pairs of pulleys 94, 96, 97, 98 and thence downwardly, having, at the ends thereof, separate weights 99, 101. These weights provide upwardly directed forces at the ends of the contactor, which forces assist in stabilising the position of the rotational axis of the contactor. The coupling between the weights and contactor provided by the cables permits constant application of these forces despite some movement of the rotational axis. Furthermore, movement of the contactor away from a location in which the cables are vertical will cause application of sidewardly or axially acting restraining forces through the cables tending to restore the contactor to its previous position.

Extensible links, in the form of pneumatic rams 103, 104 are coupled to collars 105, 106 on the contactor extensions 87, 88. Selective extension of these enables either end of the contactor to be tilted so that material introduced at one end of the contactor can be caused to flow through the container. Additional weights 108, 109 on the extensions serve to counterbalance bending torques in the contactor due to the forces thereon applied by weights 99, 101.

FIGS. 11 and 12 show a contactor 56 having a plurality of longitudinally and outwardly extending vanes 60. These extend some distance outwardly from the axis of rotation of the contactor to give considerable leverage. The vanes include scoops 60a each defined by a v-shaped longitudinally extending section and these are mounted on supports 62 which extend outwardly of the contactor 56. Rotation may be induced by trapping gas bubbles in the scoops as they move vertically through the bed 70. It will be seen that, in the present instance, shaping of the vanes 60 is such that the contactor 56 will, in use, rotate clockwise as viewed in FIG. 11 due to the fact that gas bubbles will be trapped on those vanes to the left-hand side of the contactor, the scoops to this side being inverted whereas the external configuration of the scoops on the right-hand side is such as to allow the gas bubbles to pass easily around them and through spaces 61 between supports 62.

FIG. 11 shows a separate drive means 64; this comprises an air lift apparatus in the form of an air nozzle 66 the outlet opening of which is arranged to direct the air generally vertically upwardly and within the bed. The nozzle opening is disposed a short distance from a somewhat greater diameter tube 67 so that as air passes from nozzle 66 into the tube 67 fluid bed material is also carried up the tube. The outlet end 68 of the tube is disposed above the vanes to the right-hand side of the contactor as viewed in FIG. 11 so that material elevated from the tube 67 as it leaves the opening 68 falls upon the scoops 60a to the right-hand side of the contactor to induce the contactor to turn by virtue of the added weight of material in these scoops 60a.

The air lift apparatus can also be used to contact elevated bed material with upper internal surfaces of the housing 110 of the apparatus if this is required for heat transfer purposes.

The arrangement of FIGS. 11 and 12 is particularly applicable where the material from which the contactor 56 is constructed is such that it will not resist turning torque such as is induced by external mechanical drive.

The apparatus shown in FIGS. 13 and 14 includes a vessel 111 which is of hollow cylindrical configuration having end openings 113, 114 which communicate with outwardly extending axial inlet and exhaust ducts 116, 117 respectively for acceptance and removal of material to be treated. The vessel 111 may take any of a number of forms; particularly, it may be constructed for example, in the same manner as the contactors previously described with reference to FIGS. 1 to 12.

The vessel 111 is contained within an outer housing 118 which is also of hollow cylindrical configuration, being coaxial with the vessel 111. Housing 118 has axial end openings 119, 121 and coaxial ducts 122, 124 which extend outwardly from these in surrounding concentric relationship to the ducts 116, 117 respectively.

Housing 118 is supported for free rotation about its axis by bearings (not shown). These bearings may support the container by engagement with bearing surfaces surrounding ducts 122, 124 or they could, alternatively, support the outer housing at points along its length. Drive means (also not shown) is provided for rotating the outer housing about its axis.

The inner vessel 111 is secured to the outer housing by means of members 126 (FIG. 15) extending between the outer surface of vessel 111 and the inner surface of housing 118. Although the housing and vessel are thus secured together for rotation as a unit, the mechanical coupling provided by members 126 is such as to allow considerable movement between the housing and vessel, in directions perpendicular to the axes thereof. The members 126 shown are in the form of metal straps which extend somewhat tangentially to the outer surface of vessel 111 to enable accommodation of any relative movement between the vessel and housing which might occur during the heating or cooling of the apparatus.

The outer cylindrical wall of housing 118, between openings 119, 121, has numerous spaced perforations 120 substantially over its entire surface. A plurality of fluid inlet tuyeres 127 extend from the perforations. Only the lowermost of a number of longitudinally extending rows of these is shown completely in FIG. 13. The rows of tuyeres are coupled to a pressurised gas supply means (not shown) by means of fluid supply pipes 140 and a connection which enables continued supply of gas, at least to those of the tuyeres disposed to that part of the housing which is, for the time being, lowermost, as the housing is rotated.

Housing 118 is partly filled with a particulate bed material 131 and the tuyeres are of a configuration, such as the hooked form shown with outlet openings facing outwardly of the axis of the housing, which tends to prevent escape of fluid material from the lower tuyeres when the apparatus is not in use. Each tuyere 127 is interconnected with the fluidised supply by a separate valve 132. Each valve 132 has an actuating member 133 which extends outwardly thereof and which, in depressed condition, opens and in non-depressed condition, closes the valve. Each valve is resiliently biased to the closed condition.

A generally semi-circular cam track 134 is disposed in spaced apart surrounding relationship to the lower part of the housing 118. The cam track is fixed and is so disposed that during the rotation or oscillation of housing 118, the actuating members 133 on those of valves 132 disposed on the lower part of the housing engage the cam track to open the valves and cause fluidisation of material 131. Of course, a perforated distributor plate which could, in this case, be of cylindrical shape disposed between vessel 111 and housing 118 could be employed to assist in even distribution of the fluid supply from the tuyeres. As will be seen, the depth of the bed 131 is sufficient to contact the outer surface of vessel 111 over a substantial portion thereof.

The apparatus is arranged for circulating the material 131 through housing 118. To this end, there is provided a particulate material reservoir 137 disposed to receive overflow of fluidised bed material from aperture 121 and duct 124. A return duct 138 communicates at one end with material in reservoir 137 and at the other end with inlet ports 139 in duct 122. A heat exchanger 141 is installed in duct 138 and means (not shown) is provided for pumping material 131 through reservoir 137, through duct 138 and heat exchanger 141 to return it to housing 118 by inlet ports 139.

In use, housing 118 is set in motion and material to be treated in the apparatus is passed through container 111 via ducts 116 and 117. At the same time, a bed of material 131 is fluidised in the manner hereinbefore described by actuation of the valves 133 as they pass the cam track 134. The desired heating or cooling of the contents of vessel 111 is attained by heat transferred from the bed material which, as described, is passed through the housing 118 via duct 122 and overflows, via duct 124 to pass into reservoir 137. It is then pumped through heat exchanger 141 where it is heated or cooled before returning so that a continuous circulation of bed material through the heat exchanger 141 is attained. Of course the apparatus could also be operated by treating single batches of material.

During operation, a considerable proportion of the weight of vessel 111 is borne by the fluidised bed itself and, in fact, it would be possible to entirely dispense with members 126 so that the vessel was floated upon the bed. This would, of course, permit use of separate rates of rotation of the vessel and container. Again, by making members 126 sufficiently rigid the whole of the weight of the vessel could be borne by these.

FIG. 16 shows a modified form of mechanical interconnection between the vessel 111 and housing 118. In this case the housing has a number of radially inwardly extending supports 144 these each having at an innermost end, an arcuate bearing plate 146. The vessel 111 likewise has radially outwardly extending supports 147 and each of these has, at an outermost end thereof, an arcuate bearing plate 148. The bearing plates 146 each cooperate with a separate bearing plate 148 to maintain the vessel axis substantially in alignment with the housing axis. the fit between cooperating plates may be fairly free to allow for substantial support, in use of the apparatus, to be given to the vessel by the fluidised bed. This method of mechanical coupling permits accommodation of substantial outward and lengthwise dimensional variations in vessel 111 as it is heated or cooled.

Applications of the systems of the invention include:
1. Treatment of ores, either run of mine, sized or briquetted by reduction, oxidation, chlorination or sulphiding.
2. Carbonisation of coal briquettes or coal-metal or coal-metal oxide briquettes or coke-metal oxide briquettes.
3. Thermal decomposition and volatilisation of metallic chlorides and fluorides in an inert atmosphere.
4. Nitriding or carburizing of small metal components.
5. Annealing small metal components in a controlled atmosphere.
6. Pelletising metal powders or oxides at high temperatures.
7. Mixing molten metals.
8. Processing molten slag - carbon slurries in a controlled atmosphere.
9. Freezing irregular shaped objects such as prawns, crayfish tails, brocolli heads.

The rotated vessels may in each described instance be constructed of a single alloy or metal or an alloy or metal clad with another alloy or metal. Alternatively, it may be non-metallic material such as silicon carbide, aluminium oxide or plastic. Normally the contactor will be of comparatively large size such as of the order of 2 feet diameter by 10 feet in length or greater although it is possible to construct smaller contactors. The described arrangements have, of course, been advanced only by way of explanation and it will be appreciated that many modifications may be made thereto.

Thus although in each described embodiment utilising internal baffles, these baffles are of constant height, measured radially of the contactor they could, of course, be of differing heights along the length of the contactor to secure particular material distribution characteristics. For example, in the embodiment of FIG. 9, by arranging that baffle at the larger diameter end of contactor 21d is of greater height than at the smaller end, it would be possible to arrange for a greater concentration of material at the larger diameter end thereby eliminating the need for the ballast weight 42 or at least allowing a smaller weight to be used. Likewise the longitudinal spacing of the baffles can be varied.

The housing for bed 18 in the embodiments of FIGS. 1 to 12 is shown to have parallel-sided walls, but in certain applications, it is advantageous to slope or curve these walls. Likewise the distributor plate 16 is shown as a flat horizontal surface, but in certain applications, it may be preferable to curve and/or step the surface.

Discontinuous or alternately reversing motions of the inner vessel could be utilized to successively and repeatedly advance and retard movement of material through the apparatus.

If it is desired to immerse a considerable part of the vessel within the bed, to increase the heat transfer area, it is possible to control the amount of immersion by appropriate adjustment of the specific gravity and particle size of the bed material.

Whilst the described arrangements utilise only a single vessel in a housing it would be possible to have more than one vessel in a single housing. Furthermore, instead of heating the particulate material in the manners described, other methods could be employed. For example, particularly in a case where a conductive particulate material such as carbon were used instead of, say, sand, heating could be effected by passing an electric current through the particulate material, and the vessel and container could, of course, serve as electrodes for this purpose.

In the case of the construction of FIG. 13, the apparatus may be modified so that fluid entry into the container occurs at positions other than at the lowermost part of the housing. This might be arranged by extending the track 134 completely around the housing. By varying the spacing of the track from the axis of the cylinder, variations in inlet fluid distribution may be achieved by regulation of the fluid flow to varying degrees through the various valves.

We claim:
1. Apparatus for transferring heat to or from a substance to be treated, comprising:
    a hollow vessel which is at least partially floatable and is supported for at least vertical movement;
    an outer housing extending below and at least partially encompassing said vessel;
    transfer means for feeding the substance into said vessel and for withdrawing the substance from the vessel;
    means for forming a fluidised bed of particulate material within said housing between said vessel and said housing, said fluidised bed effecting heat transfer therethrough to or from said vessel;
    means to provide a fluidising fluid to the housing so as to fluidise the bed and to substantially wholly floatingly support the vessel during operation;
    means to support the vessel when the bed is not fluidised while allowing vertical movement of the vessel when the bed is fluidised; and
    movement means for moving said vessel whilst the vessel is substantially wholly floatingly supported by said fluidised bed.
2. Apparatus as claimed in claim 1, wherein said movement means comprises drive means coupled to said vessel annd operable to angularly move the vessel about a substantially horizontal axis.
3. Apparatus as claimed in claim 2, wherein constraining means is provided cooperating with said vessel for limiting the movement of said axis relative to said housing during angular movement of said vessel.
4. Apparatus as claimed in claim 2, wherein said transfer means includes an inlet opening at one axial end of said vessel and an outlet opening at the other axial end thereof.
5. Apparatus according to claim 4, wherein said vessel is an elongated tubular member which is generally circular in cross section.
6. Apparatus as claimed in claim 5, wherein said tubular member is generally cylindrical in configuration.
7. Apparatus as claimed in claim 5, wherein said tubular member is generally conical in configuration to facilitate continuous flow of said substance through the vessel from said inlet opening to said outlet opening.
8. Apparatus as claimed in claim 5, wherein said vessel has internal baffles to continuously move the said substance through the vessel from said inlet opening to said outlet opening as said vessel is angularly moved.

9. Apparatus as claimed in claim 5, wherein extensible means are provided, coupled to said vessel, for selectively tilting the rotational axis of the vessel to continuously move said substance through the vessel from said inlet opening to said outlet opening.

10. Apparatus as claimed in claim 5, wherein opposite axial ends of said vessel are coupled by cables to separate weights, the cables running over separate fixed guides above the vessel whereby the weights provide upwardly and sidewardly acting position stabilizing forces on said vessel.

11. Apparatus as claimed in claim 2, wherein said movement means includes vanes on said vessel and means for loading vanes on one side of the vessel with particulate material from said bed.

12. Apparatus as claimed in claim 2, wherein said movement means includes vanes on said vessel shaped to entrain gas passing through said bed preferentially to one side of said vessel.

13. Apparatus as claimed in claim 2, wherein said housing is generally cylindrical in configuration and is mounted for angular movement about said horizontal axis and said movement means operates to angularly move the housing and vessel about this axis.

14. Apparatus as claimed in claim 13, wherein said means to provide a fluidising fluid includes a plurality of gas distributor elements arranged about the curved surface of said housing, valves being provided selectively coupling those of said distributor elements which are, for the time being during angular movement of said vessel and housing, at a lowermost disposition to gas inlet means for supply of gas to the coupled distributor elements.

15. Apparatus as claimed in claim 14, wherein said valves include valve operating members coupled to cam follower members, and a cam plate located below said housing and positioned to engage the cam follower members to operate said valves as they pass the cam plate during said angular movement of said housing.

16. Apparatus as claimed in claim 2, wherein said vessel is constrained for concomitant angular movement with said housing.

17. Apparatus as claimed in claim 2, wherein said housing is fixed, and wherein said means to provide a fluidising fluid includes a gas distributor located in the base of said housing for upward passing of fluidising gas through said particulate material and gas inlet means being provided for supplying gas to said gas distributor.

18. Apparatus as claimed in claim 1, including guiding means coacting with said vessel for permitting said vessel to be vertically displaced relative to said housing, said guiding means resisting axial or sideward displacement of said vessel relative to said housing.

* * * * *